(12) United States Patent
Achanta et al.

(10) Patent No.: US 9,189,303 B2
(45) Date of Patent: Nov. 17, 2015

(54) SHADOW QUEUES FOR RECOVERY OF MESSAGES

(75) Inventors: Phani Gopal V. Achanta, Austin, TX (US); Rajiv Arora, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1751 days.

(21) Appl. No.: 11/463,785

(22) Filed: Aug. 10, 2006

(65) Prior Publication Data

US 2008/0115128 A1   May 15, 2008

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC .................................. G06F 9/546 (2013.01)

(58) Field of Classification Search
CPC ........................................ G06F 9/546
USPC ........................................... 719/314
See application file for complete search history.

(56) References Cited

U.S. PATENT DOCUMENTS

| | | | | |
|---|---|---|---|---|
| 5,280,580 | A * | 1/1994 | Brooks et al. | 709/223 |
| 5,454,099 | A | 9/1995 | Myers et al. | |
| 5,844,499 | A * | 12/1998 | Min | 340/7.52 |
| 6,119,244 | A | 9/2000 | Schoenthal et al. | |
| 6,195,709 | B1 | 2/2001 | Güpner et al. | |
| 6,282,565 | B1 * | 8/2001 | Shaw et al. | 709/206 |
| 6,353,834 | B1 | 3/2002 | Wong et al. | |
| 6,401,136 | B1 | 6/2002 | Britton et al. | |
| 6,434,605 | B1 | 8/2002 | Faulkner et al. | |
| 6,496,908 | B1 * | 12/2002 | Kamvysselis et al. | 711/162 |
| 6,496,942 | B1 | 12/2002 | Schoenthal et al. | |
| 6,560,617 | B1 | 5/2003 | Winger et al. | |
| 7,152,078 | B2 * | 12/2006 | Yamagami | 707/204 |
| 2003/0051102 | A1 * | 3/2003 | Jacobs et al. | 711/145 |
| 2004/0017810 | A1 * | 1/2004 | Anderson et al. | 370/390 |
| 2004/0081119 | A1 * | 4/2004 | Zhong et al. | 370/328 |
| 2006/0143328 | A1 * | 6/2006 | Fleischer et al. | 710/19 |

FOREIGN PATENT DOCUMENTS

WO      WO 01/67263 A1      9/2001

OTHER PUBLICATIONS

"Minimise Fuzzy Backup Costs by Initial Filtering of Eligible Messages"; IBM Research Disclosure #453093; Jan. 2002; p. 79; Research Disclosure #93.

* cited by examiner

*Primary Examiner* — Timothy A Mudrick
(74) *Attorney, Agent, or Firm* — Russell Ng PLLC; Libby Z. Toub (57) ABSTRACT

A method, system and computer program product for handling an electronic message in a data processing system are disclosed. The method comprises receiving an electronic message and storing the electronic message in a message store. An address of the electronic message is stored in a primary queue and the address of the electronic message is stored in one or more configured shadow queues. Responsive to successful completion of one or more tasks related to the electronic message, the address of the electronic message is deleted from the associated queue, and responsive to completion of all tasks related to the electronic message, the electronic message is deleted from the message store.

21 Claims, 7 Drawing Sheets

SHADOW QUEUES FOR RECOVERY OF MESSAGES

BACKGROUND OF THE INVENTION

1. Technical Field

The present invention relates in general to system message transmission and in particular to message queuing in a data processing system. Still more particularly, the present invention relates to a system, method and computer program product for implementing shadow queues for recovery of messages.

2. Description of the Related Art

In distributed computing environments, the performance of tasks is driven by the routing of incoming messages into and out of a queue. The handling of queues for performance frequently damages queue reliability by removing data prematurely. An example of a system driven by incoming events is present in the Java 2 Enterprise Edition (J2EE).

In such a system, particularly for enterprise applications, a messaging queue is present, which contains a table of addresses of messages in a message store and routes messages to components at an appropriate time based on queuing rules. Components "listen to the queue" by receiving and processing incoming messages. Users of Java 2 Enterprise Edition refer to this mechanism as the java messaging service (JMS).

In some systems, queuing behavior is specified by programming constructs. In Java 2 Enterprise Edition, a message-driven bean (MDB) is a construct that specifies the queuing behavior of messages. Users of such message constructs implement an "onMessage" component to the message, in which the programmer deals specifically with the content of the incoming message while the underlying MDB infrastructure handles the system details, such as message queueing and routing, and communication details, such as Domain Name Server behavior, in a user-transparent fashion.

Specifically, incoming messages in a Java 2 Enterprise Edition environment are received and stored onto a message database. The lifetime of a message stored in the message database is equivalent to the receiving MDB's transaction lifetime (i.e. until the next asynchronous hop). However the lifetime of a J2EE application transaction can exceed an MDB's transaction lifetime, thus requiring the availability of actual messages beyond the J2EE transaction lifetime. Recovery purposes represent a common use of message stores and therefore consume a significant portion of system resources.

Systems such as those described above are designed to provide transactional support. As a result, if there are multiple tasks within a transaction, they typically exhibit "all or nothing" behavior. If any of them fails, then all are classified as having failed together. The "all or nothing" behavior is provided by the fact that, at the end of any transaction, the system will check all internal tasks within the transaction. If any component transaction fails, then all component transactions are rolled back to their original state.

Normally, transactions end upon a shift to another queue or another thread, when the originating MDB completes its invocation and arrives at the back end of the transaction, ending the transaction. Subsequently, as a part of a message database cleanup, the message is cleaned from the queue. However, if the application is an event-driven system with multiple asynchronous hops, such behavior will lead to premature message deletion before all the asynchronous hops are completed, a state which hinders features such as failure recovery.

The prior art method used to circumvent such problems is to store the incoming message in a separate persistent store (a database or a persistent queue) which is associated with an application's transaction lifetime as opposed to a J2EE component's transaction lifetime. This method excessively consumes system resources and inhibits performance. A solution is needed that addresses the resource consumption problems associated with the prior art. What is needed is a system, method and computer program product for implementing shadow queues for recovery of messages.

SUMMARY OF THE INVENTION

A method, system and computer program product for handling an electronic message in a data processing system are disclosed. The method comprises receiving an electronic message and storing the electronic message in a message store. An address of the electronic message is stored in a primary queue and the address of the electronic message is stored in one or more configured shadow queues. Responsive to successful completion of one or more tasks related to the electronic message, the address of the electronic message is deleted from the associated queue, and responsive to completion of all tasks related to the electronic message, the electronic message is deleted from the message store.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
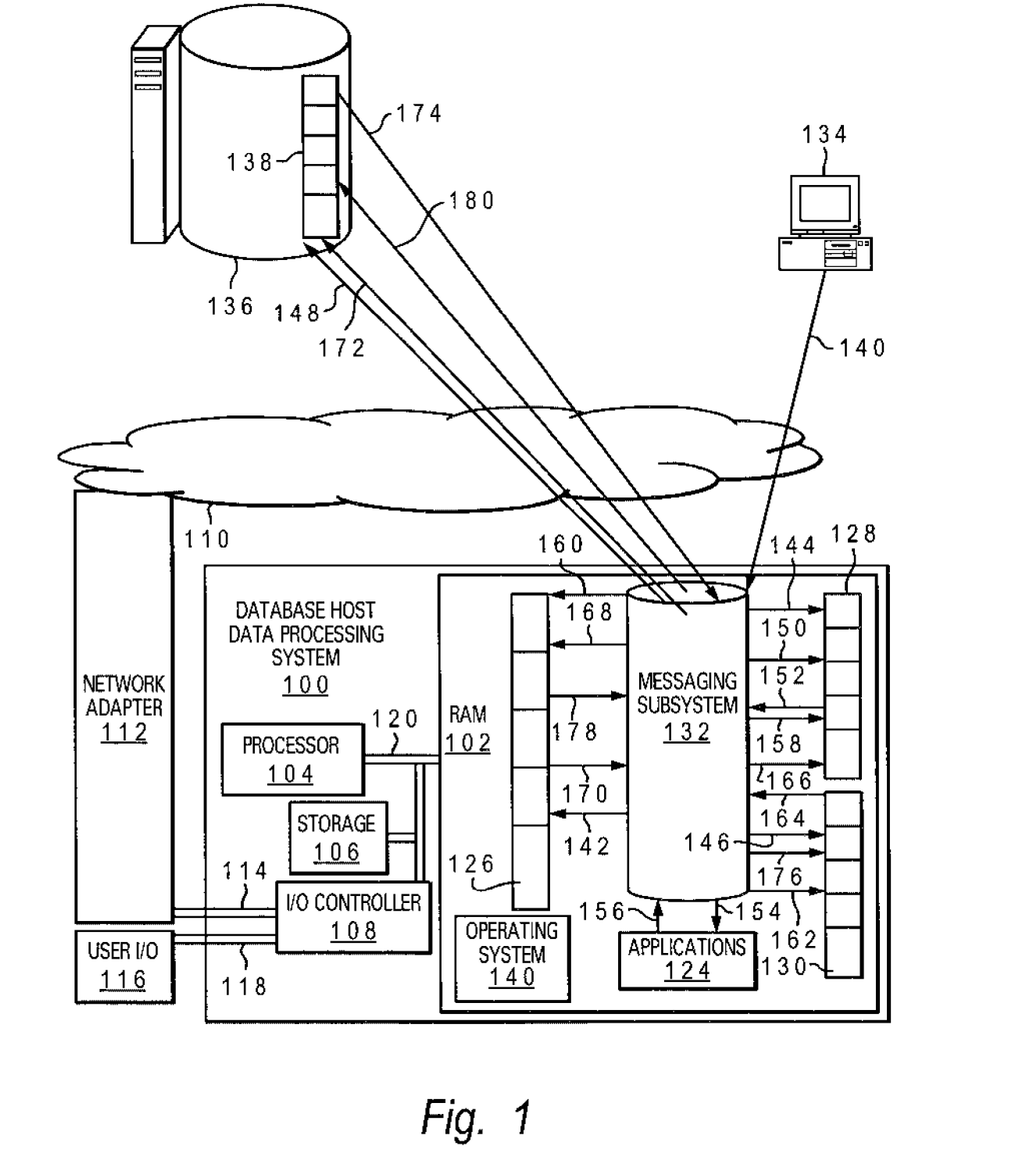
FIG. 1 illustrates a data processing system in a network environment, in which a preferred embodiment of the present method system and computer program product for implementing shadow queues for recovery of messages are implemented.

With reference now to figures and in particular with reference to FIG. 1, there is depicted a data processing system in a network environment, in which a preferred embodiment of the present method system and computer program product for implementing shadow queues for recovery of messages are implemented. Database host data processing system 100 contains a processing storage unit (e.g., RAM 102) and a processor 104. Database host data processing system 100 also includes non-volatile storage 106, such as a hard disk drive or other direct-access storage device. An Input/Output (I/O) controller 108 provides connectivity to a network 110 through a network adaptor 112 and a connective link, such as a network connector 114. I/O controller 108 also connects to user I/O devices 116 such as a keyboard, a display device, a mouse, or a printer through wired or wireless link 118, such as cables or a radio-frequency connection. System interconnect 120 connects processor 104, RAM 102, storage 106, and I/O controller 108.

Within RAM 102, database host data processing system 100 stores several items of data and instructions while operating in accordance with a preferred embodiment of the present invention. These include a messaging subsystem 132 with messaging functions for routing, storing, and managing incoming and outgoing messages and instructions, applications 124 for performing instructions contained in messages, a message store 126 for storing queued messages, a primary queue 128, which contains an address table for sorting messages in message store 126 according to appropriate queuing rules and a shadow queue 130, which contains a separately-evolving copy of the address table of primary queue 128 for restoring the content of primary queue 128 after the occurrence of errors. In a preferred embodiment, shadow queue 130 is a secure data structure. The structures referenced above interact through the transmission of a series of messages, which will be described below. An operating system 190 controls the interaction of messaging subsystem 132, applications 124, processor 104, storage 106, and I/O controller 108.

Database host data processing system 100 also interacts with a client data processing system 134 and remote storage data processing system 136, which contains a secure remote shadow queue 138. Remote shadow queue 138 contains a separately-evolving copy of the address table of primary queue 128 for restoring the content of primary queue 128 after the occurrence of errors, through secure communication using encrypted messages across network 110. The creation of shadow queue 130 and remote shadow queue 138 by messaging subsystem 132 results in a redundant set of multiple secure shadow queues. While the present invention is depicted with respect to a network 110 and a separately embodied client data processing system 134 and remote storage data processing system 136 containing secure remote shadow queue 138, one skilled in the art will quickly realize that client data processing system 134 and remote storage data processing system 136 containing secure remote shadow queue 138 can be implemented as processes running on a single database host data processing system 100 or on different partitions or instances of a database host data processing system 100 through a virtual network without departing from the scope of the present invention.

The present invention operates, as described in the flowcharts below, through the sending and receipt of messages, which are likewise detailed below. Initially, client data processing system 134 sends a request message 140 across network 110 to database host data processing system 100. Once request message 140 arrives at database host data processing system 100, message 140 is routed from network adapter 112 to I/O controller 108 and across system interconnect 120 to RAM 102, where operating system 190 delivers request message 140 to messaging subsystem 132. Messaging subsystem 132 then routes a store message 142, containing the content of request message 140, to message store 126.

Message store 126 replies to store message 142 by sending an address locator 178, containing the address in message store 126 of the content of store message 142, to messaging subsystem 132. Messaging subsystem 132 subsequently sends an enqueue message 144, containing the address in message store 126 of the content of store message 142 and rules for queue handling of store message 142, to primary queue 128. Messaging subsystem 132 then sends a shadow queue enqueue message 146, containing the address in message store 126 of the content of store message 142 and rules for queue handling of store message 142, to one or more shadow queues 130. A secure remote shadow queue enqueue message 148, containing the address in message store 126 of the content of store message 142 and rules for queue handling of store message 142, can also be sent across network 110 to secure remote shadow queue(s) 138 on remote storage data processing system 136.

When messaging subsystem 132 is required by application 124 to give a message, messaging subsystem 132 sends a next entry request 150 to primary queue 128. Primary queue 128 responds by sending a next message address 152, containing an address in message store 126 for the next queued instruction, to messaging subsystem 132. Operating system 190 next routes an instruction request 168 to message store 126, to which message store 126 responds with an instruction content message 170. Messaging subsystem 132 forwards instruction content message 154 to applications 124. The message handling component (MDB in J2EE systems) of applications 124 handles the message and calls the necessary steps in order to perform the relevant task. Upon completion of the component's transaction, messaging subsystem 132 sends a delete instruction 158 to primary queue 128. The purpose of delete instruction 158 is to order primary queue 128 to purge the address sent in next address 152.

Thus, if applications 124 successfully complete all the tasks associated with instruction content message 154, applications 124 send a delete instruction 156 to the messaging subsystem 132. Upon deletion of all addresses from all the primary and shadow queues, messaging subsystem 132 sends a delete directive 160 to message store 126.

In the event that applications 124 fail to complete all associated tasks, the transaction associated with the failed task is rolled back. As part of the rollback, the message from the message store 126 is restored to all the associated shadow queues thus returning the system back to the state it was in before receiving the message.

In the event that applications 124 fail to send a delete message 156 indicating result completion success to messaging subsystem 132, messaging subsystem 132 can send a shadow retrieval request 162 regarding the address in message store 126 of the instruction sent in order message 154, to shadow queue 130 and receive a shadow restore result 164 containing the address in message store 126 of the instruction sent in order message 154. Alternatively messaging subsystem 132 can send a remote shadow retrieval request 172 to secure remote shadow queue 138 on remote storage data processing system 136 and receive a remote shadow restore result 174 the address in message store 126 of the instruction sent in order message 154. Messaging subsystem 132 can then send a restore update 166 to primary queue 128 to restore the address of the application order message 154 for which result completion success message 156 was never received.

Figure 2:
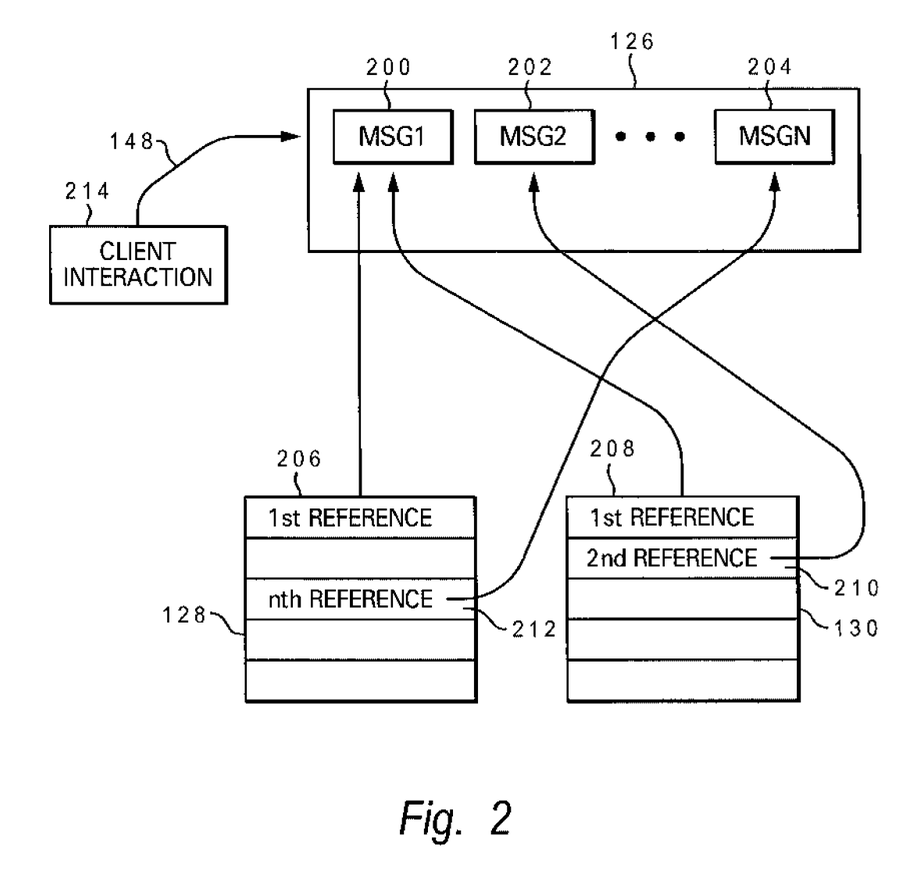
FIG. 2 depicts a queuing environment in accordance with a preferred embodiment of the present method system and computer program product for implementing shadow queues for recovery of messages.

Turning now to FIG. 2, a queuing environment in accordance with a preferred embodiment of the present method, system and computer program product for implementing shadow queues for recovery of messages is depicted. Message store 126 contains a series of messages including a first message 200, a second message 202, and an $n^{th}$ message 204. Primary queue 128 contains a first reference 206 pointing to first message 200, which is copied as first reference 208 first message 200 on shadow queue 130. A second reference 210 on shadow queue 130 points to second message 202, while an nt reference 212 on primary queue 128 points to $n^{th}$ message 204. The results of client interaction 214 are transmitted as enqueue message 148.

Figure 3A:
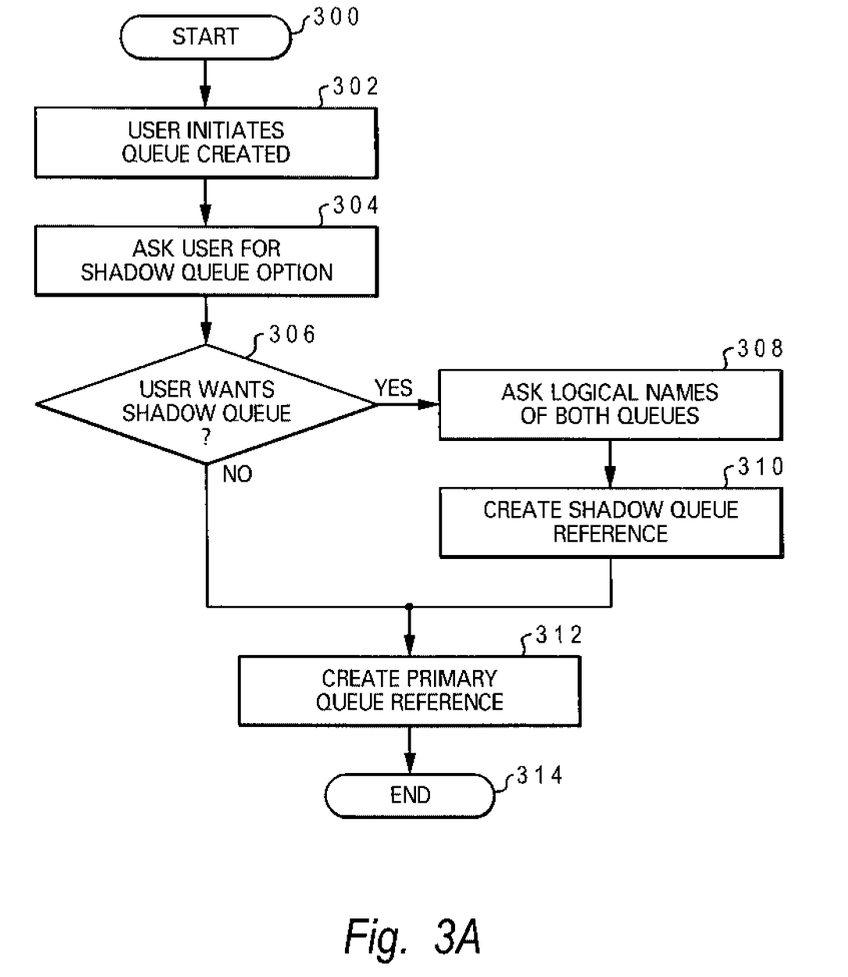
FIG. 3a is a high-level logical flowchart for a process of administration for shadow queues for recovery of messages in accordance with a preferred embodiment of the present invention.

Referring now to FIG. 3a, a high-level logical flowchart for a process of administration of shadow queues for recovery of messages in accordance with a preferred embodiment of the present invention is illustrated. The process starts at step 300 and proceeds to step 302, which illustrates a user initiating queue creation though an application 124. The process then moves to step 304. Step 304 illustrates application 124 asking the user whether the user desires a shadow queue option. The process next moves to step 306, which depicts application 124 determining whether the user requires a shadow queue 130. In alternative embodiments within the scope of the present invention, application 124 will list the creation of a shadow queue 130 as part of a queue creation command. If application 124 determines that the user requires a shadow queue 130, then the process proceeds to step 308. Step 308 illustrates application 124 asking a user for the logical names of both primary queue 128 and shadow queue 130. In alternative embodiments within the scope of the present invention, application 124 will pass logical names of primary queue 128 and shadow queue 130 as part of a queue creation command.

The process then moves to step 310. Step 310 illustrates messaging subsystem 132 creating a reference for shadow queue 130. The process then proceeds to step 312, which depicts operating system 132 creating a reference for primary queue 128. The process then ends at step 314. Returning to step 306, if application 124 determines that the user does not want a shadow queue 130, then the process returns to step 312.

Figure 3B:
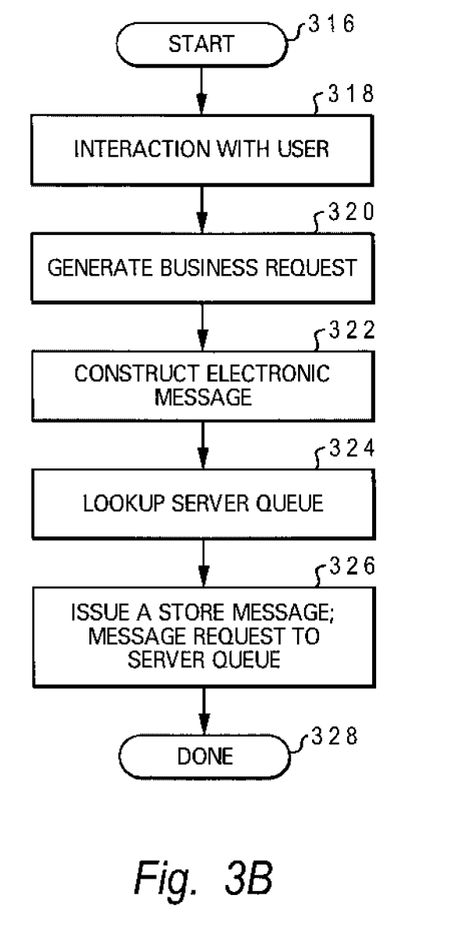
FIG. 3b is a high-level logical flowchart for a process of client interaction for shadow queues for recovery of messages in accordance with a preferred embodiment of the present invention.

Turning now to FIG. 3b, a high-level logical flowchart for a process of client interaction with shadow queues for recovery of messages in accordance with a preferred embodiment of the present invention is presented. The process starts at step 316 and then proceeds to step 318, which illustrates interaction by application 124 with a user. The process next moves to step 320. Step 320 illustrates application 124 generating a business request in the form of order message 154. The process then moves to step 322. At step 322, application 124 constructs an electronic message in the form of order message 154. The process then moves to step 324, which depicts messaging subsystem 132 performing a look up operation for a server queue, such as primary queue 128. The process then moves to step 326. Step 326 illustrates messaging subsystem 132 issuing a store of a user message request to a server queue. The process then ends at step 328.

Figure 3C:
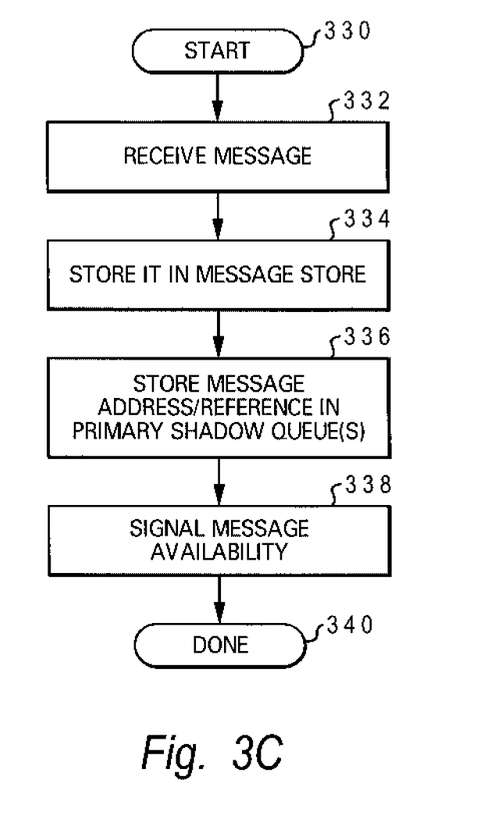
FIG. 3c is a high-level logical flowchart for a process of server-side message reception for shadow queues for recovery of messages in accordance with a preferred embodiment of the present invention.

Referring now to FIG. 3c, a high-level logical flowchart for a process of server-side message reception for shadow queues for recovery of messages in accordance with a preferred embodiment of the present invention is illustrated. The process starts at step 330. The process next moves to step 332, which depicts messaging subsystem 132 receiving a message. The process then moves to step 334. Step 334 illustrates messaging subsystem 132 storing the message received in step 332 in message store 126. The process then proceeds to step 336. Step 336 illustrates messaging subsystem 132 storing the message received in step 332 with addresses and references in primary queue 128 and shadow queue 130. The process then proceeds to step 338, which illustrates messaging subsystem 132 signaling message availability. The process ends at step 340.

Figure 3D:
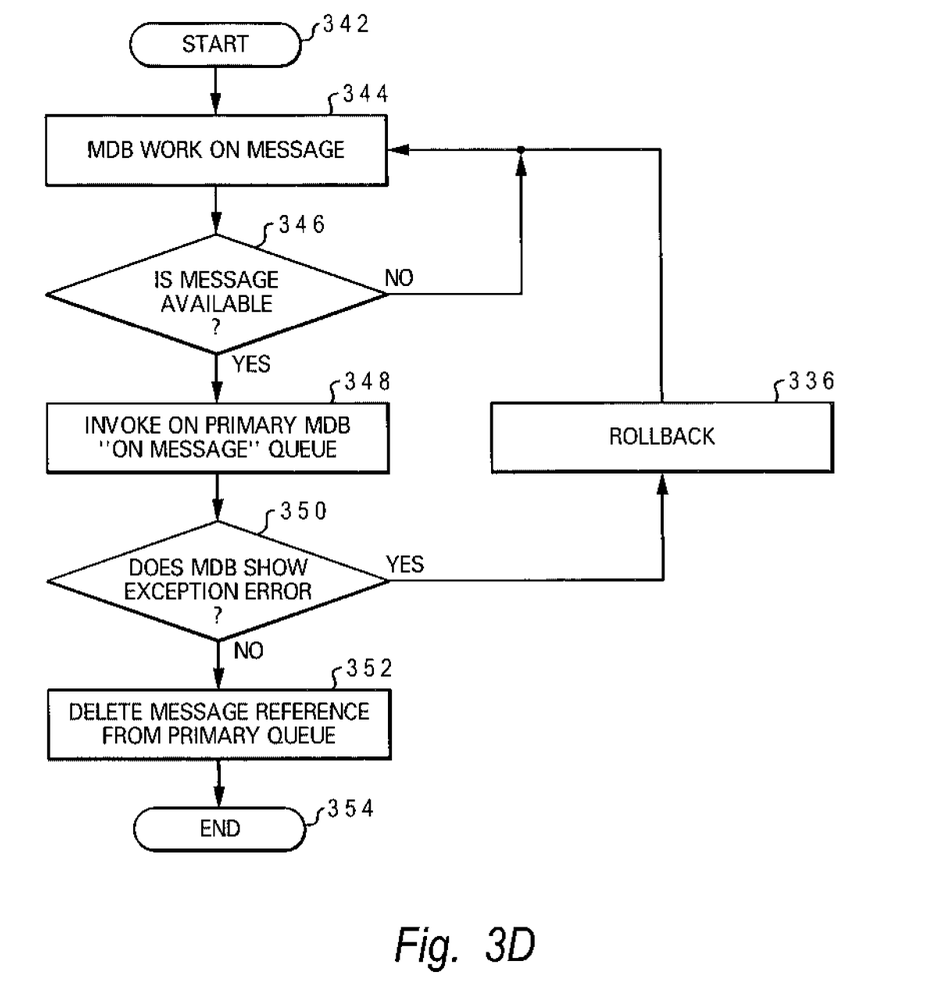
FIG. 3d is a high-level logical flowchart for a process of server-side message processing using shadow queues for recovery of messages in accordance with a preferred embodiment of the present invention.

Turning now to FIG. 3d, a high-level logical flowchart for a process of server-side message processing using shadow queues for recovery of messages in accordance with a preferred embodiment of the present invention is presented. The process starts at step 342 and then moves to step 344, which depicts messaging subsystem 132 waiting for an available message. The process then moves to step 346, which illustrates messaging subsystem 132 determining whether a message is available. If messaging subsystem 132 determines that no message is available, then the process returns to step 344. By contrast, if messaging subsystem 132 determines that a message is available, then the process proceeds to step 348, which illustrates messaging subsystem 132 invoking a message handling component (MDB in J2EE systems) on a primary queue 128 for the message. The process then proceeds to step 350. Step 350 illustrates messaging subsystem 132 determining whether the message handling component (MDB in J2EE systems) shows an exception or error. If messaging subsystem 132 determines that the message handling component (MDB in J2EE systems) shows an exception or error, then the process proceeds to step 356, which illustrates a roll back step. The process then returns to step 344.

Returning to step 350, if messaging subsystem 132 determines that the message handling component (MDB in J2EE systems) does not show an exception or error, then the process returns to step 352, which illustrates messaging subsystem 132 deleting the message reference from the primary queue 128. The process then ends at step 354.

Figure 3E:
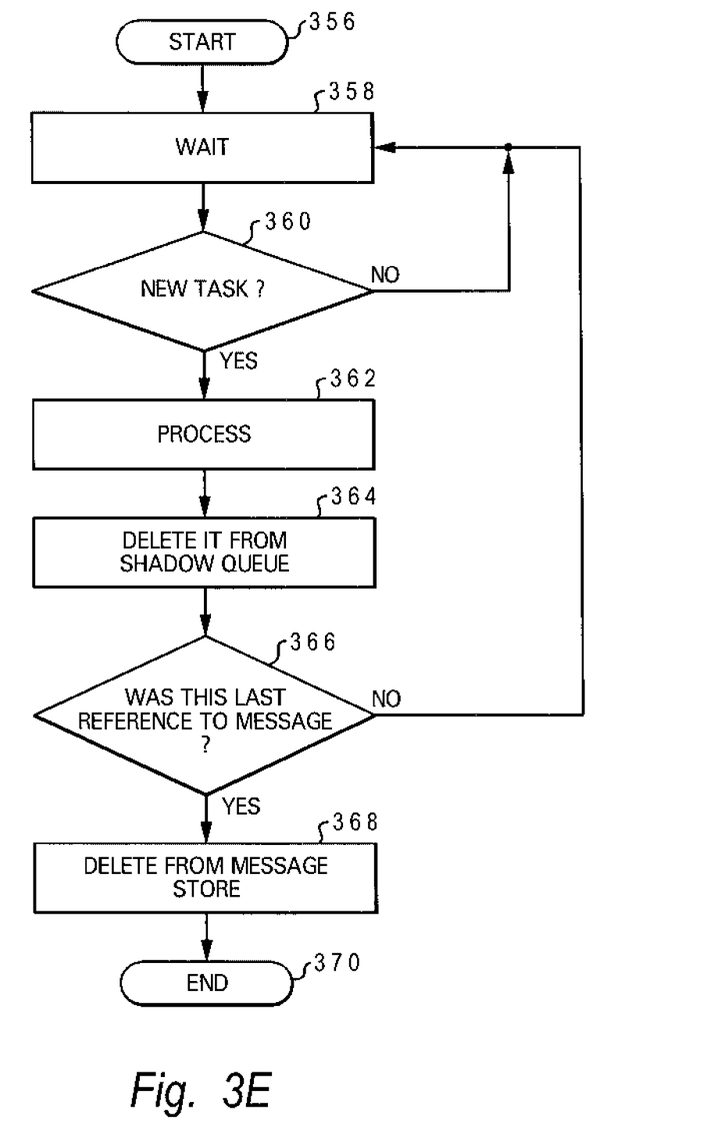
FIG. 3e is a high-level logical flowchart for a process of interaction by other application threads for shadow queues for recovery of messages in accordance with a preferred embodiment of the present invention.

Referring now to FIG. 3e, a high-level logical flowchart for a process of interaction by other application threads with shadow queues for recovery of messages accordance with a preferred embodiment of the present invention is illustrated. The process starts at step 356. The process then moves to step 358 which depicts messaging subsystem 132 waiting for receipt of a new task. The process next proceeds to step 360, which depicts messaging subsystem 132 determining whether a new task is ordered. If messaging subsystem 132 determines that no new task is ordered, then the process returns to step 358. In an alternative embodiment within the scope of the present invention, application 124 signals the end of a "task" associated with a message, which triggers the messaging subsystem 132 to delete that task from the shadow queue 130, and, if application 124 deletes the last reference to the task in shadow queue 130, then application 124 deletes the message from message store 126. If messaging subsystem 132 determines, however, that a new task has been ordered, then the process proceeds to step 362, which illustrates messaging subsystem 132 processing the new task. The process then moves to step 364. Step 364 depicts messaging subsystem 132 deleting the task from shadow queue 130. The process then proceeds to step 366.

At step 366, messaging subsystem 132 determines whether the task deleted in step 364 was the last reference to a particular message. If messaging subsystem 132 does not determine that the task processed in step 362 was the last reference to a particular message, the process returns to step 358. If, however, messaging subsystem 132 determines that the process performed in step 362 was the last reference to a particular message, then the process proceeds to step 368, which illustrates messaging subsystem 132 deleting the message processed in step 362 from message store 126. The process then ends at step 370.

The present invention provides a system, method and computer program product for implementing shadow queues for recovery of messages. This method provides, at lower resource cost than prior art methods, a stored backup copy of messages that is a useful reference for failure recovery.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memo~2~ elements can include local memory employed during actual execution of the program code, bulk storage, and cache memories which provide temporary storage of at least some program code in order to reduce the number of times code must be retrieved from bulk storage during execution.

Input/output or I/O devices {including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method of handling an electronic message in a data processing system, said method comprising:
   in response to receiving an electronic message, the data processing system:
      storing said electronic message in a message store in a location associated with an address;
      storing the address of said electronic message in a primary queue and in a shadow queue separate from said primary queue, such that the address is held contemporaneously in the primary queue and the shadow queue, wherein the primary queue is maintained within data storage allocated to a first operating system instance;
   the data processing system executing first and second applications, wherein the second application associates a longer transaction lifetime with the electronic message than does the first application;
   creating said shadow queue in data storage allocated to a different second operating system instance by one a set including the first and second applications;
   responsive to a completion of the transaction lifetime associated with the electronic message by the first application, the data processing system deleting said address of said electronic message from said primary queue; and
   thereafter, retaining the address of the electronic message in the shadow queue and, responsive to completion of the transaction lifetime associated with the electronic message by the second application, deleting said address of said electronic message from said shadow queue.

2. The method of claim 1, further comprising:
   responsive to deleting said address of said electronic message from said primary queue and deleting said address of said electronic message from said shadow queue, deleting said electronic message from said message store.

3. The method of claim 1, wherein said step of storing said address of said electronic message in a shadow queue further comprises storing said address of said electronic message in multiple redundant shadow queues.

4. The method of claim 1, wherein:
   the data processing system is a host data processing system; and
   the method further comprises the host data processing system receiving a request message including the electronic message from a remote client data processing system.

5. The method of claim 1, and further comprising:
   the first application processing the electronic message during the transaction lifetime of the first application; and
   the second application processing the electronic message during the transaction lifetime of the second application.

6. The method of claim 1, wherein executing the first application includes executing a message driven bean.

7. The method of claim 1, wherein storing the electronic message in a message store comprises storing the electronic message in a database.

8. A data processing system that handles an electronic message for first and second applications, wherein the second application associates a longer transaction lifetime with the electronic message than does the first application, said data processing system comprising:
   a processor that executes the first and second applications; and
   data storage coupled to the processor;
   program code within the data storage that, when executed by the processor, causes the data processing system to perform:
      responsive to receiving an electronic message:
         storing said electronic message in a message store in a location associated with an address;
         storing an address of said electronic message in a primary queue and in a shadow queue separate from said primary queue, such that the address is held contemporaneously in the primary queue and the shadow queue, wherein the primary queue is maintained within data storage allocated to a first operating system instance;

creating said shadow queue in data storage allocated to a different second operating system instance by one a set including the first and second applications;

responsive to completion of the transaction lifetime associated with the electronic message by the for first application, deleting said address of said electronic message from said primary queue; and thereafter retaining the address of the electronic message in the shadow queue and, responsive to completion the transaction lifetime associated with the electronic message by the second application, deleting said address of said electronic message from said shadow queue.

9. The data processing system of claim 8, wherein the program code further causes the data processing system to perform:

responsive to deleting said address of said electronic message from said primary queue and deleting said address of said electronic message from said shadow queue, deleting said electronic message from said message store.

10. The data processing system of claim 8, wherein storing said address of said electronic message in a shadow queue further comprises storing said address of said electronic message in multiple redundant shadow queues.

11. The data processing system of claim 8, wherein:
the data processing system is a host data processing system; and
the program code further causes the host data processing system to perform receiving a request message including the electronic message from a remote client data processing system.

12. The data processing system of claim 8, wherein the program code further causes the data processing system to perform:
the first application processing the electronic message during the transaction lifetime of the first application; and
the second application processing the electronic message during the transaction lifetime of the second application.

13. The data processing system of claim 8, wherein the first application includes a message driven bean.

14. The data processing system of claim 8, wherein the message store comprises a database.

15. A computer program product for handling an electronic message in a data processing system, said computer program product comprising:
a computer-readable storage medium; and
program code stored within the computer-readable storage medium for causing a data processing system to perform:
in response to receiving an electronic message, the data processing system:
storing said electronic message in a message store in a location associated with an address;
storing the address of said electronic message in a primary queue and in a shadow queue separate from said primary queue, such that the address is held contemporaneously in the primary queue and the shadow queue, wherein the primary queue is maintained within data storage allocated to a first operating system instance;

creating said shadow queue in data storage allocated to a different second operating system instance by one a set including the first and second applications;

the data processing system executing first and second applications, wherein the second application associates a longer transaction lifetime with the electronic message than does the first application;

responsive to completion of the transaction lifetime associated with the electronic message by the second application, deleting said address of said electronic message from said primary queue; and thereafter, retaining the address of the electronic message in the shadow queue and, responsive to completion of the transaction lifetime associated with the electronic message by the second application, deleting said address of said electronic message from said shadow queue.

16. The computer program product of claim 15, wherein the program code further causes the data processing system to perform:
responsive to deleting said address of said electronic message from said primary queue and deleting said address of said electronic message from said shadow queue, deleting said electronic message from said message store.

17. The computer program product of claim 15, wherein said storing said address of said electronic message in a shadow queue further comprises storing said address of said electronic message in multiple redundant shadow queues.

18. The computer program product of claim 15, wherein:
the data processing system is a host data processing system; and
the program code further causes the host data processing system to perform receiving a request message including the electronic message from a remote client data processing system.

19. The computer program product of claim 15, wherein the program code further causes the data processing system to perform:
the first application processing the electronic message during the transaction lifetime of the first application; and
the second application processing the electronic message during the transaction lifetime of the second application.

20. The computer program product of claim 15, wherein the first application includes a message driven bean.

21. The computer program product of claim 15, wherein the message store comprises a database.

* * * * *